United States Patent [19]

Michaels et al.

[11] 4,287,327

[45] Sep. 1, 1981

[54] PROCESS FOR CONTROLLING POLYMER PARTICLE SIZE IN VAPOR PHASE POLYMERIZATION

[75] Inventors: Glenn O. Michaels; Michael J. Spangler, both of South Holland, Ill.

[73] Assignee: Standard Oil Company (Indiana), Chicago, Ill.

[21] Appl. No.: 191,854

[22] Filed: Sep. 29, 1980

[51] Int. Cl.³ .............................................. C08F 2/34
[52] U.S. Cl. ...................................... 526/86; 526/87; 526/352; 526/901; 526/903; 526/909
[58] Field of Search ................... 526/86, 87, 901, 903, 526/909

[56] References Cited

U.S. PATENT DOCUMENTS

| 3,875,075 | 4/1975 | Boone et al. | 526/124 |
|---|---|---|---|
| 3,925,338 | 12/1975 | Ort | 526/86 |
| 3,957,448 | 5/1976 | Shepard et al. | 526/65 |
| 3,965,083 | 6/1976 | Jezl et al. | 526/65 |
| 3,971,768 | 7/1976 | Peters et al. | 526/68 |
| 4,003,712 | 1/1977 | Miller | 526/88 |
| 4,101,289 | 7/1978 | Jezl et al. | 526/65 |
| 4,130,699 | 12/1978 | Hoff et al. | 526/86 |

FOREIGN PATENT DOCUMENTS 1354020  5/1974  United Kingdom .

Primary Examiner—Stanford M. Levin
Attorney, Agent, or Firm—David E. Boone; William T. McClain; William H. Magidson

[57] ABSTRACT

A process for controlling polymer particle size distribution in the vapor phase polymerization of olefins comprises contacting fresh catalyst with a stream of wetting liquid before the catalyst is dispersed in the polymer bed, said wetting liquid being introduced at a wetting liquid flux density greater than about 20.

7 Claims, No Drawings

PROCESS FOR CONTROLLING POLYMER PARTICLE SIZE IN VAPOR PHASE POLYMERIZATION

In recent years several low pressure vapor phase olefin polymerization systems have been described in the art. These processes commonly utilize either a fluidized bed reactor or a horizontal stirred-bed reactor. The fluidized-bed reactor is exemplified by U.S. Pat. No. 4,003,712 of Miller incorporated herein by reference while the horizontal stirred-bed process is described in the commonly assigned U.S. Pat. Nos. 4,101,289 to Jezl et al.; 3,971,768 to Peters et al.; 3,965,083 to Jezl et al.; and 3,957,448 to Shepard et al. which are incorporated herein by reference. These patents teach that for best operation of the processes the size of the polymer particles formed should be within certain size limits. If polymer particles are too small, these "fines" can be carried out of the reactor by recycle gas and cause plugging in the recycle system. In the case of the stirred-bed reactor system the fines can plug recycle lines, quench nozzles and due to electrostatic charge cause handling problems in the reactor and after removal from the reactor. If polymer particles are too large, there can be problems in maintaining the bed in a fluidized state or in the case of a stirred-bed reactor maintaining a proper bed inventory. Consequently, there is a need for a method of controlling the particle size distribution of polymer formed in vapor phase reactor systems.

U.S. Pat. Nos. 3,957,448; 3,965,083; 3,971,768; and 4,101,289 disclose that the particle size of the polymer produced in the stirred-bed reactor can be changed by varying the concentration of the catalyst being introduced into the reactor; however, varying the catalyst concentration during the polymerization reaction is disadvantageous because of the resulting difficulty in maintaining a constant polymer production rate and the need to maintain a minimum slurry flow through the catalyst feed lines to the reactor to avoid catalyst settling in the lines. Further, these patents teach that the polymer bed should be kept dry, i.e., the partial pressure of the quench liquid should be kept below the dew point. British Pat. No. 1,354,020 describes a vertical stirred-bed vapor phase polymerization process and teaches that no "mush or paste" should be allowed to form in the zone containing the polymer particles; otherwise agglomeration can occur, apparently forming large polymer lumps.

The general object of this invention is to provide a process for controlling particle size distribution of polymer formed during polymerization of one or more olefins in a vapor phase reactor.

Another object of this invention is to minimize the quantity of polymer fines formed during polymerization of at least one olefin in a vapor phase reactor. Other objects appear hereinafter.

As used herein, the terms "polymer bed" and "bed of polymer particles" refer to the inventory of polymer particles that is present in the reactor and with which fresh polymerization catalyst is brought into contact.

The "wetting liquid" used in the instant invention can be any material which is liquid when introduced into the reactor but which vaporizes under the polymerization conditions and does not hinder the polymerization reaction.

The term "wetting liquid stream" is used herein to mean the body of flowing wetting liquid as it contacts the polymer bed.

The term "wetting liquid flux density" is used herein to mean the volume of wetting liquid added to the polymer bed per unit cross-sectional area of the stream of wetting liquid per unit time. The cross-sectional area of the wetting liquid stream is ordinarily the cross-sectional area of the conduit hereinafter referred to as the line through which the stream passes before contacting the polymer bed.

The calculation to determine the wetting liquid flux density is illustrated by using the quantities from Example I hereinbelow. An average of 188 milliliters of wetting liquid were added through a 3/16 inch diameter (0.476 centimeter) line per 60 minutes. The cross-sectional area for the 0.476 centimeter diameter wetting liquid stream is 0.178 cm$^2$. Therefore, the wetting liquid flux density is 188 milliliters per 0.178 cm$^2$ per 60 minutes which corresponds to 17.6 (milliliter/cm$^2$/minute). While the volume, cross-sectional area and time can be expressed in any convenient units, for the purposes of this application the volume of wetting liquid will be expressed in milliliters, the cross-sectional area of the stream of wetting liquid in square centimeters, and the time in minutes. Accordingly, if different units are used, the wetting liquid flux density values must be appropriately adjusted.

Other things being equal when the volume of wetting liquid is increased, the wetting liquid flux density is increased. As either the cross-sectional area of the wetting liquid stream or the unit time is increased while the volume of wetting liquid is constant, the wetting liquid flux density is decreased.

It has now been found that the objects of this invention are accomplished in the continuous vapor phase polymerization of at least one olefin utilizing a polymerization catalyst which is charged to an existing bed of polymer particles by contacting said catalyst with a stream of wetting liquid before the catalyst is dispersed in the polymer bed, said wetting liquid being introduced at a wetting liquid flux density of greater than about 20.

Applicants have discovered that larger polymer particles and less fines are produced when a wetting liquid flux density in excess of about 20 is used. As the value for the wetting liquid flux density is decreased below about 20, the level of polymer fines increases and can cause operating difficulties in a vapor phase polymerization process. Consequently, it is preferred that the wetting liquid flux density be greater than about 25. However, the amount of wetting liquid used should not be so great as to exceed the dew point of the reactor as a whole because the resulting condensation of wetting liquid can result in polymer buildup on reactor walls and agitator blades and the formation of large lumps of polymer which make operation difficult. The dew point for a particular wetting liquid at the temperature and pressure in the reactor can be readily calculated by one skilled in the art. Ordinarily, the wetting liquid flux density would not exceed about 200 with the preferred range being about 25 to 80.

The optimum wetting liquid flux density to produce a particular polymer particle size distribution in the practice of the instant invention depends upon variables in the polymerization system which affect the rate of vaporization of the wetting liquid. Principal among these variables are the gas recycle rate, the rate of agitation of polymer in the reactor, the temperature of the polymer bed, and the quench liquid addition rate. For example, as either the gas recycle rate, reactor temperature or agitation is increased, the rate of wetting liquid removal from the polymer bed is increased and consequently the rate at which the wetting liquid is added with the catalyst must be increased to maintain the desired polymer particle size distribution. Conversely, as the quench liquid addition rate is increased, the rate of addition of wetting liquid must be decreased to avoid exceeding the dew point of the reactor.

Since the optimum wetting liquid flux density depends upon the hereinabove described variables in the polymerization system, it must ordinarily be determined experimentally for each such system. The preferred operating procedure in situations where the optimum flex density is not known is to initiate the polymerization reaction at a low wetting liquid flux density value, preferably in the range of about 15 to 20 and then gradually increase the wetting liquid flux density by adding larger quantities of wetting liquid per unit of time until the desired polymer particle size is obtained or until an acceptably low level of polymer fines is obtained.

As set forth hereinabove, the materials useful as the wetting liquid are liquid when introduced into the vapor phase polymerization reactor but vaporize under the polymerization conditions and do not hinder the polymerization reaction. In a preferred mode of operation the wetting liquid used in the process of the instant invention is the same as the quench liquid used to remove the heat of polymerization. As taught in U.S. Pat. No. 4,101,289, alkanes such as propane, a butane, a pentane, a hexane or closely boiling mixtures of such alkanes can be used. The preferred quench liquid for ethene polymerization is isobutane or isopentane. Where a readily condensable monomer such as propane is polymerized, the quench liquid can be liquified monomer or a mixture of liquified monomer and an additional quench liquid.

During the usual polymerization reaction, fresh catalyst is continuously introduced into the reactor. This continuous addition can involve the constant addition of a stream of fresh catalyst or the repetitive addition of quantities of fresh catalyst. The latter method is often utilized for the introduction of catalyst as a dry powder.

The preferred method of introducing the wetting liquid into the reactor depends upon the catalyst being used and its method of introduction into the reactor. Ordinarily, catalyst is introduced into the reactor as a slurry in an inert hydrocarbon which can contain recycled quench liquid or in a cooled stream of monomer. If this slurry method of catalyst addition is used, the wetting liquid may either be (a) combined with the catalyst slurry before the catalyst enters the reactor as taught in U.S. Pat. Nos. 4,101,289; 3,957,448; 3,965,083; and 3,971,768, or (b) added through a separate line situated such that the wetting liquid will contact the catalyst before the catalyst is dispersed throughout the polymer bed. When recycled quench liquid is used to convey the catalyst into the reactor, it is preferred that the catalyst be reversibly deactivated to avoid plugging of the catalyst addition lines as taught in commonly assigned U.S. Pat. No. 4,130,699 of Hoff et al. incorporated herein by reference.

The addition of the wetting liquid through a line separate from the catalyst addition line allows the rate of catalyst addition to be kept constant while the rate of wetting liquid addition is independently varied as necessary to control polymer particle size distribution. Further, a separate line for adding the wetting liquid is particularly useful when the catalyst is introduced into the reactor as a dry powder. When a catalyst slurry is utilized, it is preferred that the wetting liquid line and catalyst slurry line terminate immediately above the surface of the polymer bed. These lines can also be extended into the polymer bed thereby introducing the catalyst and wetting liquid beneath the surface of the polymer bed. However, in each method of wetting liquid addition, the opening of the wetting liquid line must be oriented to cause the wetting liquid to contact the catalyst before the catalyst is dispersed into the polymer bed. Ordinarily, the catalyst slurry line and wetting liquid line are oriented to deposit the respective streams on the same area in the polymer bed.

As stated hereinabove, Applicants have found that for best results the wetting liquid should contact the polymerization catalyst before the catalyst is dispersed throughout the polymer bed. Since the polymer bed is agitated during the polymerization process, the catalyst is rapidly dispersed; therefore, the wetting liquid and catalyst must be introduced essentially simultaneously at the same location in the polymer bed. While the mechanism by which the wetting liquid modifies the polymer particle size is uncertain, Applicants believe that the wetting liquid forms a "wet zone" around the catalyst particles during the initial stage of the polymerization reaction. It is postulated that this wet zone either minimizes catalyst particle fracture during polymerization or causes growing polymer particles to adhere to one another thereby giving larger polymer particles and reduced fines.

The process described herein can be applied to the vapor phase polymerization of polymerizable monomers which are polymerizable below the softening points of their polymeric forms. The term "monomer" is used herein to mean polymerizable olefins including ethene, propene, 4-methylpentene-1, butene-1, hexene-1, butadienes, styrene and mixtures of such olefins. The process is particularly suited for the polymerization of ethene, propene, and mixtures thereof.

In general, the catalysts which are most useful to the process described herein are those which are very active and give a high yield of polymer. By high yield is meant catalysts and co-catalysts, the residues of which do not have to be removed from the products of the process. Commonly, the catalyst is a transition metal compound of Group IV or Group V such as a titanium or vanadium compound, a compound of Group VI such as a chromium or molybdenum compound or one or more of the above compounds supported on a magnesium-based support or a support such as alumina, silica or silica-alumina. The catalyst can be used with co-catalysts such as organometallic compounds of Groups IA, IIA and IIIA.

The preferred catalysts and co-catalysts for ethene polymerization are a trialkylaluminum co-catalyst with a catalyst comprising at least one titanium, vanadium or chromium compound such as titanium tetrachloride, tetrabutyltitanate, vanadium tetrachloride, chromium or chromic oxide supported, for example, on magnesium-based support, or silica, silica-alumina or alumina support. For propene polymerization it is preferable to use an active titanium trichloride which can be supported preferably on a magnesium-based support with an aluminum alkyl co-catalyst.

While the invention is described in connection with the specific Examples below, it is understood that these are provided for illustrative purposes only. Many alternatives, modifications and variations will be apparent to those skilled in the art in light of the hereinbelow Examples and such alternatives, modifications and variations fall within the scope and spirit of the appended claims.

EXAMPLE I

This Example illustrates the polymer particle size distribution obtained when a total of 220 milliliters per hour of isopentane wetting liquid were added in a stream along with the catalyst corresponding to a wetting liquid flux density of 17.6.

A carbon steel reactor with a four-inch internal diameter and ten inches in length and a total volume of about two liters was mounted horizontally. A stirring shaft to which were attached paddles passed lengthwise through the reactor and was turned by a Magnedrive unit. Polymer inventory was maintained by a weir mounted near the back of the reactor where polymer exited. Excess polymer spilled over the weir and was removed through a series of valves so as to maintain the pressure in the reactor. Dilute catalyst-hexane slurry from a stirred reservoir was pumped continuously into the reactor through a line having an internal diameter of 3/16 inch and positioned near the front of the reactor. The heat of polymerization was removed by recycling the reactor gas consisting of ethylene, hydrogen and isopentane through a condenser to condense most of the isopentane quench liquid into a reservoir with the more volatile components circulated back into the reactor through ports in the bottom. Part of the isopentane was added to the reactor through spray nozzles above the polymer bed. Another portion of the isopentane was combined with the catalyst slurry in a tee immediately before the catalyst entered the reactor. The quantity of quench combined with the catalyst could be varied to change the amount of quench present in immediate proximity with the catalyst in the reactor. The product was periodically dumped from the reactor through the series of valves so as not to interrupt the continuous process. In this run the reactor was charged with 250 grams of clean, dry, particulate high density polyethylene screened through 7 mesh. The reactor was then evacuated and 200 milliliters of isopentane containing one gram of triethylaluminum were pumped through a port in the head of the reactor separate from the catalyst addition port. Hydrogen was added to a positive pressure and the reactor was heated at 170° F. for about 48 hours. The catalyst reservoir was charged with a $TiCl_4$-magnesium trichloroacetate-$AlCl_3$ catalyst prepared as taught by Boone et al. in U.S. Pat. No. 3,875,075, incorporated herein by reference, to a concentration of 40 milligrams per liter in isopentane. The reactor was heated to 180° F. and, after pressuring with ethylene and 30-35 mole % hydrogen to a total pressure of 300 p.s.i.g., catalyst slurry was pumped through a line which terminated in the stirred polymer bed at the rate of 217 milliliters per hour. After 245 minutes a solution of isopentane containing 1.1 milligram triethylaluminum per milliliter was pumped into the reactor at a rate of 60 milliliters per hour for 30 minutes. The polymerization reaction began during the triethylaluminum addition and continued for another 164 minutes. After venting the reactor and maintaining a positive atmosphere of hydrogen for about 16 hours, ethylene and 30-35 mole % hydrogen were added to a total pressure of 300 p.s.i.g. Catalyst slurry was pumped into the reactor at an average rate of 188 milliliters per hour which corresponded to an average rate of 7.5 milligrams of catalyst per hour during the polymerization reaction. Throughout the polymerization reaction no isopentane was introduced in addition to that added with the catalyst and triethylaluminum. The polymer product was screened to determine the particle size distribution and the results are given in Table I.

EXAMPLE II

This Example illustrates the effect on polymer particle size distribution when 270 milliliters per hour of isopentane wetting liquid were added along with the catalyst corresponding to a wetting liquid flux density of about 25.2. This run was a continuation of Example I using the same equipment, catalyst, and conditions except that the triethylaluminum was added to the stirred catalyst reservoir to give a catalyst-triethylaluminum weight ratio of 1:1. This catalyst slurry was pumped at the rate of 210 milliliters per hour to a tee on the reactor where an additional 60 milliliters per hour of isopentane were combined with it to give a stream of 270 milliliters per hour passing into the reactor. The polymerization reaction was continued for 380 minutes. The polymer product was screened to determine particle size and the results are given in Table I.

EXAMPLE III

This Example illustrates the effect on polymer particle size distribution when 300 milliliters per hour of isopentane wetting liquid were added along with the catalyst corresponding to a wetting liquid flux density of about 39.3. This run was a continuation of Example I except that the amount of isopentane added to the catalyst slurry was increased to 120 milliliters per hour to give a total stream of 420 milliliters per hour passing into the reactor. This was continued for 255 minutes and then the reactor was vented and hydrogen was introduced to a positive pressure. After approximately 66 hours the polymerization was continued with the same conditions except the catalyst concentration was decreased from 40 milligrams per milliliter of isopentane to 27 milligrams per milliliter of isopentane and the pumping rate of the slurry was increased to 315 milliliters per hour to give a total slurry feed rate of 420 milliliters per hour corresponding to a wetting liquid flux density of about 39.3. The polymer was screened as in Example I and the results are given in Table I.

TABLE I

| Example No.: | I | II | III |
|---|---|---|---|
| Catalyst conc., mg/liter: | 40 | 40 | 27 |
| Catalyst addition rate, mg/hr: | 7.5 | 8.4 | 8.1 |
| Isopentane feedrate with catalyst, ml/hr: | 188 | 210 | 300 |
| Additional Isopentane feedrate, ml/hr: | 0 | 60 | 120 |
| Total Isopentane feedrate, ml/hr: | 188 | 270 | 420 |
| Wetting Liquid Flux Density, ml/cm$^2$/min: | 17.6 | 25.2 | 39.3 |
| Gas recycle rate/Isopentane addition rate | | | |
| *Liters (STP)/ml of Isopentane | 6.6 | 4.6 | 3.0 |
| *SCF/gallon of solvent | 886 | 618 | 396 |
| % original polymer bed remaining | 5 | 27 | 14 |
| **Sieve analysis of polymer product, wt. % | | | |
| On ¼ inch | 0.4 | 0.4 | 2.2 |
| On 7 mesh | 0.6 | 0.6 | 5.0 |
| On 12 mesh | 0.6 | 1.1 | 5.2 |
| ***On 20 mesh | 1.0 | 4.4 | 17.3 |

TABLE I-continued

| Example No.: | I | II | III |
|---|---|---|---|
| On 40 mesh | 2.5 | 7.1 | 27.7 |
| On 60 mesh | 10.5 | 25.0 | 24.5 |
| On 80 mesh | 10.0 | 6.3 | 4.4 |
| Through 80 mesh | 74.4 | 55.1 | 13.8 |

*STP is Standard Temperature and Pressure, SCF is Standard Cubic Feet
**U.S. Bureau Standards, Standard Screen Series, 1919
***20 mesh is 0.84 millimeters These results in Table I show that as additional wetting liquid (isopentane) was added to the catalyst slurry stream the polymer particle size increased as shown by the decrease in the quantity of polymer fines. In Example I where the wetting liquid flux density was 17.6 the quantity of polymer product which passed through an 80 mesh screen was 74 weight %. When the wetting liquid flux density was increased to 39.3 in Example III, the quantity of polymer product which passed through an 80 mesh screen decreased to 13.8 weight %.

EXAMPLE IV

This Example illustrates the polymer particle size distribution obtained when all the liquid was added through the catalyst addition port. 201 grams of clean, dry, high density polyethylene screened through 60 mesh and held on 10 mesh was added to the dry reactor of Example I. The reactor was evacuated overnight at 180° F. One liter of isopentane containing 2 grams of triethylaluminum was added to scavenge impurities in the system. After stirring for several minutes, the reactor was vented to remove most of the isopentane and then pressured to a total pressure of 300 p.s.i.g. with ethylene and 35 mole % hydrogen. The catalyst reservoir was charged with a TiCl$_4$-magnesium trichloroacetate-AlCl$_3$ catalyst prepared as taught by Boone et al. in U.S. Pat. No. 3,875,075 to a concentration of 20 milligrams per liter in isopentane and triethylaluminum was added to give a catalyst to triethylaluminum weight ratio of 1:1. The catalyst slurry was pumped to a tee on the reactor at an average rate of 305 milliliters per hour where isopentane was added to the catalyst stream at the rate of 120 milliliters per hour so that the total catalyst slurry feedrate into the reactor was 425 milliliters per hour corresponding to a wetting liquid flux density of 39.8. The results obtained by screening several samples of polymer taken during the polymerization are given in Table II.

EXAMPLE V

This Example illustrates polymer particle size distribution obtained when part of the liquid was added through a port separate from the catalyst addition port. The same equipment, procedure and conditions were used as in Example IV except the line for adding extra isopentane was switched from the tee on the catalyst inlet port to the port in the head of the reactor, that is, the same configuration as in Example I. This allowed part of the isopentane to be added to the polymer bed in the reactor about 4 inches from the point at which the catalyst slurry was being added. The catalyst slurry was added at the rate of 250 milliliters per hour corresponding to a wetting liquid flux density of 23.4 at a concentration of 15 milligrams of catalyst per milliliter and a catalyst to triethylaluminum weight ratio of 1:5. The additional isopentane was added through the port in the head of the reactor at a rate of 120 milliliters per hour. The catalyst addition was stopped if the reaction temperature increased more than 5° F. and restarted when the temperature approached 180° F. The run was stopped when the total time catalyst had been added to the reactor was 525 minutes. The results of screening several samples of polymer from the run are given in Table II.

TABLE II

| Example No.: | IV | | | |
|---|---|---|---|---|
| Catalyst conc., mg/liter: | 15–20 mg/liter | | | |
| Isopentane feedrate with catalyst, ml/hr: | 425 | 425 | 425 | 425 |
| Separate Isopentane feedrate, ml/hr: | 0 | 0 | 0 | 0 |
| Total Isopentane feedrate, ml/hr: | 425 | 425 | 425 | 425 |
| Wetting Liquid Flux Density, ml/cm$^2$/min: | 39.8 | 39.8 | 39.8 | 39.8 |
| Wt % original polymer bed remaining: | 59 | 15 | 5 | 2 |
| *Sieve Analysis of polymer product, wt. % | | | | |
| **On 60 mesh | 41 | 57 | 80 | 89.5 |
| On 80 mesh | 10 | 17 | 7 | 4 |
| On 100 mesh | 3 | 8.3 | 3 | 2.5 |
| Through 100 mesh | 46 | 17.7 | 11 | 4 |

| Example No.: | V | | | |
|---|---|---|---|---|
| Catalyst conc., mg/liter: | 15 mg/liter | | | |
| Isopentane feedrate with catalyst, ml/hr: | 250 | 250 | 250 | 250 |
| Separate Isopentane feedrate, ml/hr: | 120 | 120 | 120 | 120 |
| Total Isopentane feedrate ml/hr: | 370 | 370 | 370 | 370 |
| Wetting Liquid Flux Density, ml/cm$^2$/min: | 23.2 | 23.2 | 23.2 | 23.2 |
| Wt % original polymer bed remaining: | 100 | 35 | 14 | 6 |
| *Sieve Analysis of polymer product, wt. % | | | | |
| **On 60 mesh | 89.5 | 79.2 | 67.7 | 69.3 |
| On 80 mesh | 4 | 12 | 7.6 | 7.5 |
| On 100 mesh | 2.5 | 2.5 | 4.7 | 4.4 |
| Through 100 mesh | 4 | 8.8 | 14.3 | 15.9 |

*U.S. Bureau Standards, Standard Screen Series, 1919
**60 mesh is 0.25 millimeters These results in Table II show the effect on polymer particle size distribution when a portion of the wetting liquid (isopentane) was not added to the polymer bed in proximity with the catalyst. In Example IV all 425 milliliters of the wetting liquid (flux density 39.8) were added to the catalyst stream so that it contacted the polymer bed in proximity with the fresh catalyst. When 59 weight % of the original polymer bed remained (41 weight % of the bed was new product), 46 weight % of the polymer sampled passed through a 100 mesh screen; whereas, when only 2 weight % of the original polymer bed remained, 4 weight % of the polymer sampled passed through the 100 mesh screen. Example V was a continuation of the Example IV polymerization run except that ⅓ of the 370 milliliters of wetting liquid was added through a port about 4 inches from where the catalyst contacted the polymer bed (corresponding to a flux density of 23.2 based on 250 milliliters of wetting liquid). When 94 weight % of the original polymer bed, i.e., the polymer from Example IV, had been replaced, the quantity of polymer which passed through a 100 mesh screen had increased from the 4 weight % of Example IV to 16 weight %.

Table III shows a summary of the results obtained in Examples I-V showing the effect of wetting liquid flux density on the amount of polymer fines produced in the polymerization process. These results show that the use of a solvent flux density greater than about 20 produces lower levels of polymer fines.

TABLE III

| Example No. | I | II | III | IV | V |
|---|---|---|---|---|---|
| Wetting Liquid Flux Density (ml/cm$^2$/min.) | 17.6 | 25.2 | 39.3 | 39.8 | 23.2 |
| % Polymer Fines | 74.4* | 55.1* | 13.8* | 15.9** | |

*Weight percent less than 170 microns.
**Weight percent less than 150 microns.

We claim:

1. In a process for the continuous vapor phase polymerization of at least one olefin utilizing a polymerization catalyst which is charged to an existing bed of polymer particles the improvement comprising contacting said catalyst with a stream of wetting liquid before said catalyst is dispersed in said bed, said wetting liquid being introduced at a wetting liquid flux density greater than about 20.

2. The process of claim 1 wherein said vapor phase polymerization is carried out in a horizontal, stirred-bed reactor.

3. The process of claim 1 wherein said unsaturated monomer is selected from the group consisting of ethane, propene, butene-1, hexene-1 and mixtures thereof.

4. The process of claim 2 wherein said unsaturated monomer is ethene and from 0.0 to 20.0 mole percent propene and said wetting liquid is selected from the group consisting essentially of propane, butane, pentane, isopentane, and mixtures thereof.

5. The process of claim 2 wherein said unsaturated monomer is ethene and from 0.1 to about 20 mole percent butene-1 and said wetting liquid is selected from the group consisting essentially of propane, butane, pentane, isopentane, and mixtures thereof.

6. The process of claim 2 wherein said unsaturated monomer is propene and said wetting liquid consists essentially of propene.

7. The process of claim 2 wherein said unsaturated monomer is propene and from 0.1 to about 20.0 mole percent ethene and said wetting liquid consists essentially of propene.

* * * * *